(12) United States Patent
Aschermann et al.

(10) Patent No.: US 7,873,320 B2
(45) Date of Patent: Jan. 18, 2011

(54) DYNAMIC ANTENNA CONTROL

(75) Inventors: Benedikt Aschermann, Wuppertal (DE);
Hans van Nigtevecht, Enschede (NL);
Halbe Hageman, Rijen (NL)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 986 days.

(21) Appl. No.: 10/596,916

(22) PCT Filed: Dec. 31, 2003

(86) PCT No.: PCT/EP03/14981

§ 371 (c)(1),
(2), (4) Date: Mar. 7, 2007

(87) PCT Pub. No.: WO2005/064967

PCT Pub. Date: Jul. 14, 2005

(65) Prior Publication Data

US 2007/0146228 A1 Jun. 28, 2007

(51) Int. Cl.
*H04B 15/00* (2006.01)
*H04M 1/00* (2006.01)

(52) U.S. Cl. .................................. 455/63.4; 455/562.1

(58) Field of Classification Search ................. 455/63.1, 455/63.4, 562.1; 342/354, 368
See application file for complete search history.

(56) References Cited

U.S. PATENT DOCUMENTS

| 2004/0014429 A1* | 1/2004 | Guo ............................. 455/73 |
| 2004/0106436 A1* | 6/2004 | Ochi et al. ................ 455/562.1 |
| 2004/0166902 A1* | 8/2004 | Castellano et al. ........ 455/562.1 |
| 2007/0249405 A1* | 10/2007 | Goldberg .................. 455/562.1 |

FOREIGN PATENT DOCUMENTS

WO  WO 01/15477 A  3/2001

* cited by examiner

*Primary Examiner*—Nguyen Vo

(57) ABSTRACT

Undesired interfering signal sources within a wireless communication network disturb the radio communication between radio base stations and mobile stations. The invention presents a method and device wherein the beam pattern of an antenna, comprising two or more sectorised antenna elements with overlapping beam patterns, is adapted such that the position of the source of interfering signal is preferably substantially located within the overlap of said beam patterns. The one or more beam patterns are adapted in bearing such that the resulting interfering signal is reduced by the superimposing effect of radio wave propagation within the overlap area.

19 Claims, 3 Drawing Sheets

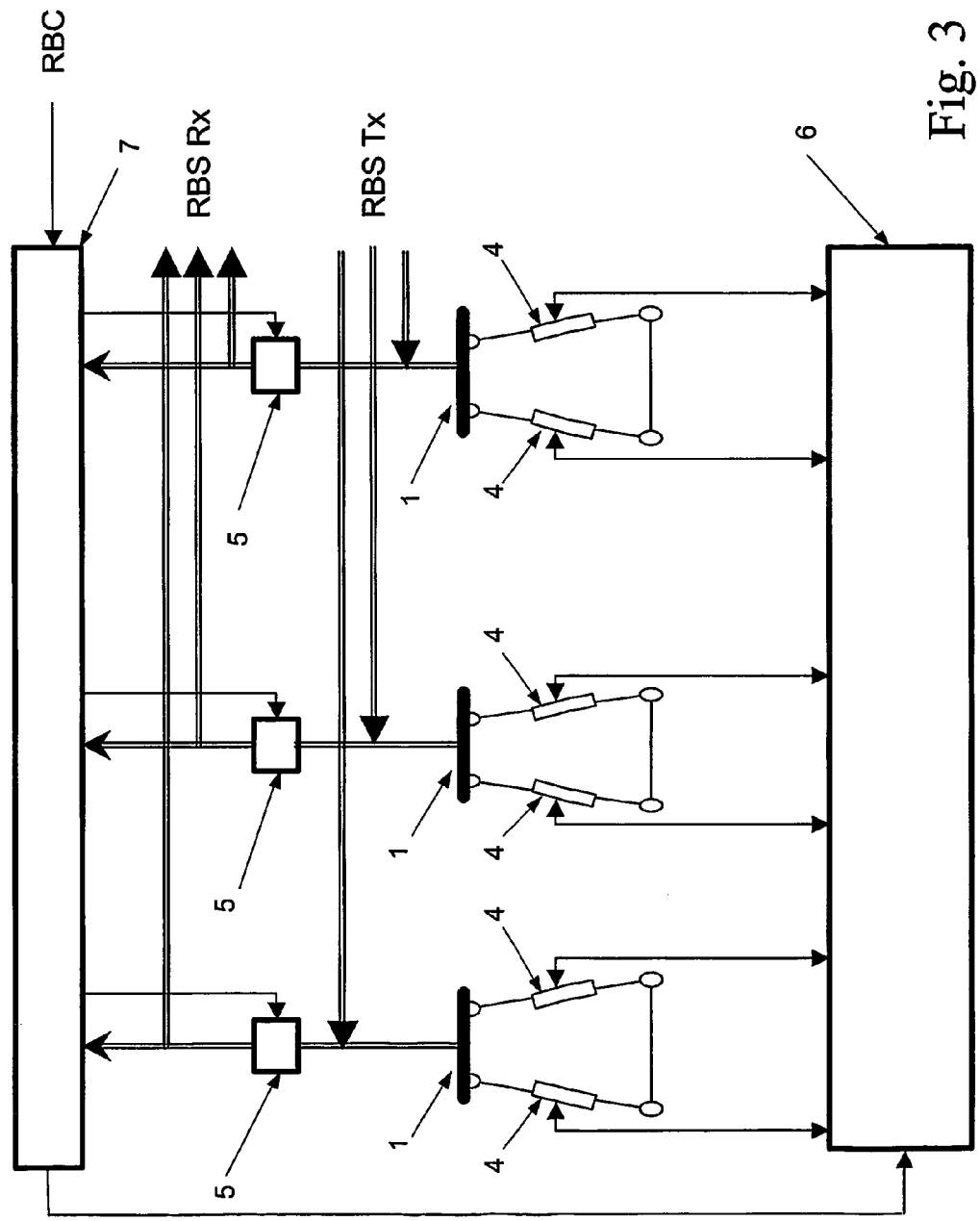

DYNAMIC ANTENNA CONTROL

FIELD OF THE INVENTION

The present invention relates generally to wireless radio communications systems, such as cellular communication systems, having mobile stations and a radio network infrastructure. More particularly, the present invention facilitates a method and system for reducing undesired interference caused by signal sources in a cellular radio communication network such as Code Division Multiple Access (CDMA) networks, Global System for Mobile (GSM) communication systems, Personal Handyphone System (PHS) and Pacific Digital Cellular (PDC).

BACKGROUND OF THE INVENTION

State of the art wireless communication systems, such as 2.5 and 3.rd generation networks, based on standards such as United States Digital Cellular (USDC IS-54, IS-94 and ID-136), Global System for Mobile communication (GSM), Code Division Multiple Access (CDMA, IS-95) deploy a cellular concept of network coverage for mobile stations (MS) by means of a plurality of fixed Radio Base Stations (RBS) provided with antennas.

In most cases a base station provides its transmitting signal and retrieves its receiving signal from an antenna, mounted at an antenna mast. Antenna masts are usually placed at locations such that the one or more antennas, mounted in said mast, provide a predefined coverage of the radio cell, serviced by an RBS.

It will be understood that communication over the air interface within a cell, just like any radio propagation, might be subject to unexpected and undesired signals, interfering with the desired signals between RBS and MS.

Undesired signals may be generated by interfering signal sources as e.g. other (unsynchronised) radio systems operating in the same bandwidth, or not properly suppressed equipment within the service area of the cell, having a transmit level that causes interference with the desired signals.

One of the solutions to this interference problem is to change the tilt of the antenna. For interfering signal sources close to the antenna, the antenna is tilted upward to reduce the nearby sensitivity. Likewise the antenna is tilted downward when the interfering signal source is in the outer part of the coverage area of the base station. Tilting of an antenna of an RBS as state of the art method to suppress interference has a disadvantage in that a decrease of sensitivity for interfering signal sources also affects sensitivity of the RBS's for reception of the signals from MS's.

Most commonly deployed RBS's are provided with a single mast with 3 antenna elements where each antenna element covers a sector of approximately 120 degrees, having some overlap between the beams of the adjacent antenna elements.

Even when encountering the fact that there is some overlap, tilting of an antenna element will have impact on a part of an antenna element beam pattern of at least 90 degrees resulting in a deviation of the desired coverage area of said antenna beam pattern where radio communication between RBS's and MS's could be reduced.

Tilting of antenna elements affects reception of mobile stations which limits the tilting in practice. This undesired limiting effect is even more extensive when the interfering signal source is present at the overlapping area of the radiation pattern of two antenna elements of the same mast, requiring both antenna elements to be tilted.

SUMMARY OF THE INVENTION

It is an object of the present invention to improve radio communication in a wireless radio communication system by providing a method of reducing the impact of an interfering signal source in respect of a desired radio signal.

It is a further object of the present invention to provide a radio communication system, arranged for deploying cellular radio communication, in accordance with the improved method of the invention.

These and other advantages are achieved by the present invention in a method and system for reducing undesired interference from a radio signal source in a wireless radio communication system comprising Radio Base Stations and mobile stations, each Radio Base Station having a multiple of antenna elements, which antenna elements are mounted in each others vicinity such that their beam patterns have a predetermined overlap and where the area or bearing of the area of the overlap of the beam patterns in a substantial horizontal plane of at least two of the antenna elements is adjustable, depending on interference measurements deployed by an interference control, controlling a bearing of the at least two or more beam patterns of the said two or more antenna elements.

The method according to the present invention is based on the insight that interference, caused by an interfering signal source within the coverage area of a cell, could be reduced by positioning the overlap of coverage of two antenna elements in the direction of the interfering signal source. In relation to the position of the interfering signal source, the superimposing effect of radio waves of the two antenna elements causes a reduction of interference when the interfering signal source is physically positioned at a dip of the sensitivity pattern for a desired frequency.

Altering the overlap area of antenna element beam areas in the horizontal plane could be achieved by changing the bearing of one or more antenna elements, depending on the level of interference, the sensitivity pattern for each antenna element, the coverage area of the antenna elements, the position of the interfering signal source and position of the antenna elements with regard to the overlap area between adjacent antenna elements.

Applying the method and system according to the present invention reduces the sensitivity for desired frequencies in the horizontal plane in the bearing of the position of the interfering signal source. However as this area is considerable small compared to the total coverage area of each antenna element, the reduction of sensitivity only affects this small part of the total coverage area of the antenna elements, thereby reducing the effect of the interfering signal source on desired signals at the remaining part of the coverage area.

The present invention could be combined with the prior art tilting solution as to achieve an even more reduction of undesired signals from interfering signal sources.

The present invention could as well be combined with the prior art solution as delaying a signal from one of the antenna elements as to achieve an even more reduction of undesired signals from interfering signal sources As is indicated the bearing of antenna elements should be altered as to achieve the effect of reduction of an interfering signal source. The alteration could be achieved mechanically, as will be explained in the present invention, however the method could be deployed as well in an electronic way.

The method and system of the invention may be deployed within a state of the art implementation of public cellular networks such as CDMA, GSM and PDC as well in many microcellular/indoor networks such as Digital European Cordless Telephone (DECT), Personal Access Communication Systems (PACS), Personal Handyphone System (PHS), as well as for systems operating in unlicensed radio spectrum bands such as Industrial, Scientific and Medical (ISM) bands.

The present invention provides the advantage that the impact of an interference source is in a wireless radio communication system is reduced to only a limited area of coverage of antenna elements, thereby improving radio communication.

In a first embodiment, a mast with two or more antenna elements could be adjusted such that the overlapping area of coverage of two antenna elements is directed in the bearing of the interfering signal source.

In a second embodiment, one or more adjacent antenna elements could be adjusted such that overlapping area of coverage is altered.

In a third embodiment, in combination with the first-, the second- or the first- and second embodiments the received signal of one of the antenna elements is delayed according to prior art method as to change the superimposing wave pattern at the overlapping area of coverage.

In a fourth embodiment, in any combination with the preceding embodiments, excepting the combination with the third embodiment as such, the prior art method of tilting is deployed.

These embodiments according to the present invention are now illustrated in more detail with reference to the enclosed drawings.

BRIEF DESCRIPTION OF THE DRAWINGS

FIG. 1 presents schematically beam patterns of antenna elements wherein:

FIG. 3 presents schematically an interference control system according to the present invention.

DETAILED DESCRIPTION

Without restrictions to the scope of the invention, in order to provide a thorough understanding of the present invention, the invention is presented against the background and within the scope of state of the art wireless cellular communication systems. However, the present invention may be employed in any wireless communication system where sectorised antenna systems are deployed.

Figure 1C:
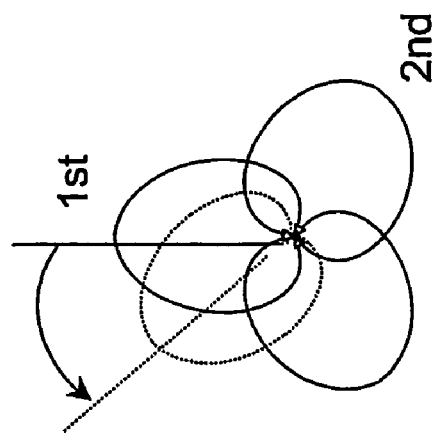
FIG. 1c depicts schematically adjusting of one beam pattern of an antenna element according to a second embodiment of the present invention.
Figure 1B:
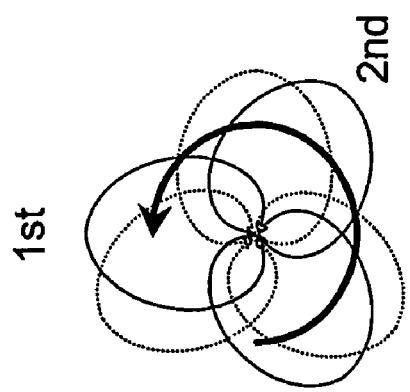
FIG. 1b depicts schematically adjusting of all beam patterns of antenna elements according to a first embodiment of the present invention.
Figure 1A:
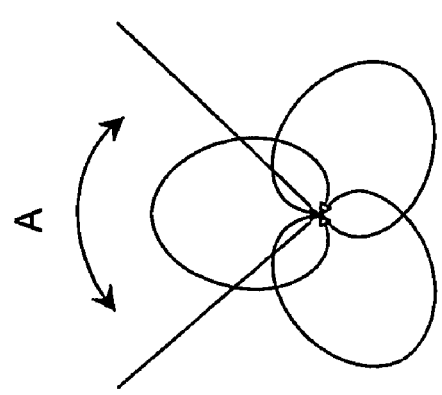
FIG. 1a depicts schematically an affected sector by tilting an antenna element according to prior art.

FIG. 1a illustrates schematically a top view of a coverage area of a sectorised antenna comprising 3 antenna elements of an RBS within a cellular communication system. The beam patterns of the adjacent antenna elements show an overlap. A prior art method of reducing interference by interfering signal sources comprises tilting upward or downward of an antenna element. By tilting an antenna element, as to reduce the interference of an interfering signal source positioned within the beam pattern of the antenna element, the coverage area is deviated from the desired coverage area of said antenna beam pattern where radio communication between RBS's and MS's could be deployed. By tilting one antenna element all MS's within the range of angle, denoted in the figure as "A", practically at least 90 degrees, are affected by this tilting action.

This undesired effect is even more extensive when the interfering signal source is present at the overlapping area of the beam pattern of two adjacent antenna elements of the same mast, requiring both antenna elements to be tilted.

The present invention however does not require tilting, with its negative effects on the desired coverage by the beam patterns, but provides a solution where the mast with its mounted antenna elements is positioned such that an interfering signal source is positioned into the overlap of the beam patterns of adjacent antenna elements by rotating the mast with the antenna elements.

FIG. 1b depicts schematically a top view of a coverage area of a sectorised antenna comprising 3 antenna elements of an RBS within a cellular communication system where the total beam pattern is rotated. At the figure an anti-clockwise rotation is depicted, although a clockwise rotation could be achieved as well. By rotating the mast with its mounted antenna elements, the beam pattern is rotated in small steps in such a way as to have to interfering signal source positioned within an overlap area of two adjacent beam patterns of two adjacent antenna elements. The rotating action is deployed until the reception of the signal, at both adjacent antenna elements, of the interfering signal source is reduced to a minimum level. For stationary interfering signal sources, this action will be finalised when the signal reception is substantially equal at both antenna elements and reduced to a minimum level. For a moving interfering signal sources, this action be continues until the a minimum level remains constant, or the interfering signal reaches a level below a threshold value that has to be chosen a practical value in relation to the value of desired signals.

FIG. 1c depicts schematically a top view of a coverage area of a sectorised antenna comprising three antenna elements of an RBS within a cellular communication system where the one beam pattern of an antenna element is altered as to alter the overlap area with a beam pattern of an adjacent antenna element. Although the action of altering only one antenna element is different from rotating all antenna elements as depicted at FIG. 1b, the effects of altering the overlap of the beam pattern with regard to an interfering signal from an interfering signal source are the same.

Figure 2:
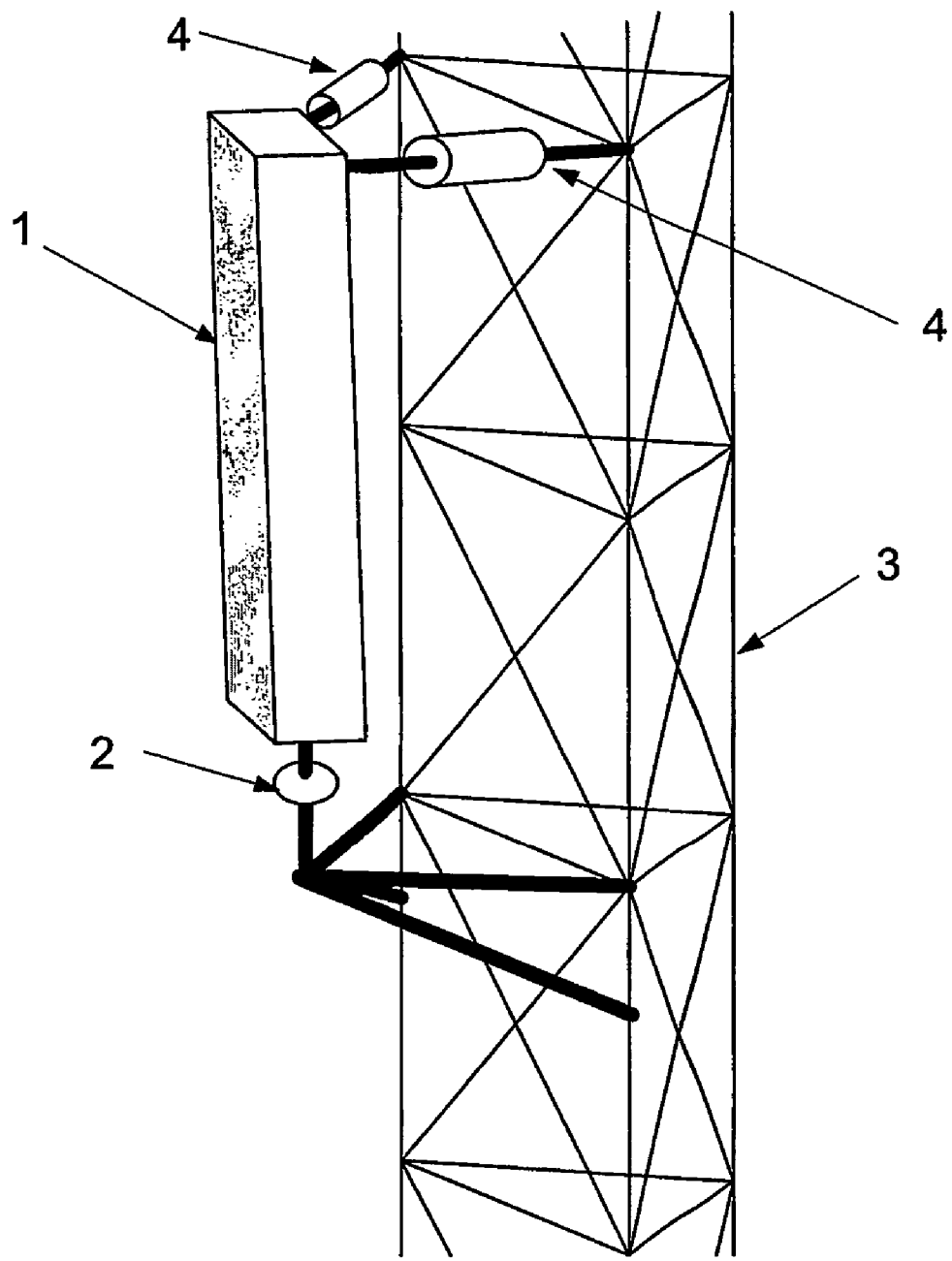
FIG. 2 presents schematically a dynamically mounted antenna element to a mast according to the invention.

FIG. 2 presents schematically an antenna element at a mast according to the invention as a mechanical solution. Although only one element is depicted for clarity, it should be understood that there should be at least two antenna elements. Practical constructions according to the invention have three to four antenna elements mounted at the same mast, preferably, but not required, at the same height.

Antenna element 1 is connectable mounted by means of two actuators 4 and rotating joint 2, enabling the antenna element pivoting. Actuators 4 and rotating joint are connectable mounted to mast 3.

Actuators 4 and rotating joint 2 are dimensioned to allow the antenna element 1 to have a rotating angle in the horizontal plane substantially at 90 degrees to both sides from its centre position. Actuators 4 are remote controlled. Actuators 4 also enable upward- and downward-tilting of the antenna element 1 by remote control.

Actuators 4 and rotating joint 2 provide means to independently change bearing and tilt of the antenna element 1. For tilting the same steering signal is provided to both actuators 4, and for bearing one actuator 4 is provided with the inverse steering signal from the other actuator 4.

FIG. 3 presents schematically an interference control system according to the present invention. For clarity three antenna elements with their corresponding mechanical actuators and signalling equipment are presented, although the actual number of antenna elements 1 can be two, three, four or even more. Antenna element 1 is connectable mounted via actuators 4 to mast 3 (not shown) where the actuators 4 are remote controlled by tilt/bearing control 6. Antenna elements 1 are deployed for sending as well as receiving signals from and to an RBS.

A signal received by antenna element 1 is forwarded to controllable phase shift device 5, providing a controlled amount of phase shift to the signal, from where the signal is forwarded to both the receiving side of the RBS, denoted as RBS Tx, and to Interference control 7. Interference control 7 receives interference characteristics information from a Radio base station controller (RBC) and the received signals by antenna elements 1 via controllable phase shift device 5. Interference control 7 controls the phase shift devices 5 and the tilting and bearing of antenna elements 1 via the tilt/bearing control 6. The sending side of the RBS is connected to the antenna elements 1, denoted as RBS Tx.

The concept of the present invention consist of adapting the overlap of the beam patterns of two adjacent antenna elements 1, such that an interfering signal, of an interfering source positioned within the overlap, yields a minimum signal value at the two adjacent antenna elements 1. By mechanically adjusting one or more antenna elements 1 by means of actuators 4 controlled by Tilt/Bearing control 6 under control of interference control 7, the position and size the overlap area of the beam pattern of antenna elements 1 is adapted.

Interference control 7 applies methods, stated below, until the signal strength of the interfering signal source is below a desired threshold or has a minimum value above said threshold.

A RBC forwards interference characteristics and a predefined value for the threshold to interference control 7.

According to a first embodiment of the invention the impact of the interfering signal source is reduced by rotating all antenna elements 1.

Interference control 7 checks the received signal strength from each antenna element 1 to obtain the strongest and the 2nd strongest signal providing antenna element 1. All antenna elements 1 are then rotated in bearing in the direction, as shown in FIG. 1b from the second strongest to the strongest antenna element 1 until the received signal strength of the interference of these two antenna elements 1 is substantial equal. The interference control 7 will continue to rotate, based on the measured values from each antenna element 1.

In special circumstances the interference source could be moving, giving a constant bearing change. The antenna elements 1 are however limited to a bearing change of somewhat more then 180 degrees. If movement is detected beyond a maximum of 60 degrees (for 3 element, if 4 are used 45 degrees etc.) from the centre position of an element, the controller rotates all antenna elements 1 by 120 degrees (if 3 elements are used, or 90 degrees if 4 elements are used, etc.) in opposite direction to obtain a new starting point.

According to a second embodiment of the invention the impact of the interfering signal source is reduced by rotating one antenna element 1.

Interference control 7 checks the received signal strength as at the first embodiment to obtain the strongest and 2nd strongest receiving element. The interference controller 7 then rotates the strongest receiving antenna element 1 in bearing away from the 2nd strongest receiving antenna element 1, as shown in FIG. 1c. In case the average interference signal strength increases the movement of the strongest receiving element is changed in the direction towards the 2nd strongest receiving antenna element 1. The interference control 7 will continue to adapt the rotation of the one antenna element 1 based on the measured signal strength of each antenna element 1. It might be clear that the bearing change of a single antenna element 1 is superimposed on the rotation of all antenna elements 1 in the first embodiment.

According to a third embodiment of the invention the impact of the interfering signal source is reduced by changing phase shift of signals received from two antenna elements 1.

As described before the interface control 7 determines a strongest and second strongest receiving antenna element 1. A positive phase shift by means of controllable phase shift device 5 is applied to the received signal from of the second strongest antenna element 1 and an equal negative phase shift is applied by means of controllable phase shift device 5 to the received signal from the strongest receiving antenna element 1. The phase shift is decreased or increased opposite to the increase or decrease of the average interference signal strength of the two antenna elements 1.

According to a fourth embodiment of the invention the impact of the interfering signal source is reduced by dynamically tilting one or more antenna elements 1.

As mentioned before, before first and second strongest receiving antenna elements 1 are determined. The tilting of these two antenna elements 1 is changed dynamically.

Each combination of previously mentioned embodiments, with the exception of a combination of the third with the fourth embodiment could be deployed according to the inventive method and system according to the invention.

Reduction of sensitivity for interfering signal sources according to the present invention in a number of embodiments and named combinations thereof provide an advantageous method for radio communication in wireless networks.

Rotating of the all beam pattern of antenna elements 1 as suggested at the description of the first embodiment could also be deployed, however less advantageously by rotating the physical mast with mounted antenna elements 1.

The present invention could be deployed with any type of sectorised antenna element 1.

Although the first, second and fourth embodiments are presented as a mechanical solution with actuators 4, it should be understood that the method as disclosed could also be applied where bearing and tilting of the beam pattern of antenna elements 1 is achieved as an electronic equivalent.

What is claimed is:

1. A method for reducing undesired interference from a radio signal source in a wireless radio communication system having a plurality of radio base stations and mobile stations, each radio base station having a multiple of antenna elements, which antenna elements are mounted in each others vicinity such that their beam patterns have a predetermined overlap, comprising the steps of:
   measuring interference by an interference control controlling a bearing of the at least two or more beam patterns of the two or more antenna elements; and
   adjusting the bearing of the area of the overlap of the beam patterns in a substantial horizontal plane of at least two of the antenna elements depending on the interference measurements, wherein
   the bearing of the overlap of the beam patterns in a substantial horizontal plane of at least two antenna elements is controlled by interference control such that the bearing substantially coincides with a position of the interfering signal source.

2. The method according to claim 1, wherein the overlap of the beam patterns in a substantial horizontal plane are beam patterns from two adjacent positioned antenna elements.

3. The method according to claim 2, wherein the bearing of the overlap of the beam patterns in a substantial horizontal plane, being the overlap formed by beam patterns from two adjacent positioned antenna elements, depends on the signal strength of the interfering signal source, received by the two adjacent positioned antenna elements.

4. The method according to claim 1, wherein the area of the overlap of the beam patterns in a substantial horizontal plane is adjustable, depending on the interference measurements deployed by an interference control controlling a bearing of one or more beam patterns of one or more antenna elements.

5. The method according to claim 1, wherein the phase of one or more signals, received by antenna elements, is adapted by controllable phase shift elements, and fed to the radio base station, where the amount of phase adapting depends on the interfering signal of the interfering signal source.

6. The method according to claim 1, further comprising the step of tilting one or more of the antenna elements, wherein the amount of tilting depends on the interfering signal of the interfering signal source.

7. The method according to claim 1, further comprising the steps of:
detecting by measurement an occurrence of an interfering signal at two or more antenna elements above a threshold value and storing the value of the measured interfering signal;
selecting two adjacent antenna elements having an overlap of their beam patterns, which antenna elements receive the two highest interfering signal values and storing the average value of the interfering signals;
adjusting a bearing of the overlap of the two beam patterns of the two selected adjacent antenna elements, such that the bearing slides a step in a direction from the antenna element with the second highest received interfering signal, by adjusting the two antenna elements controlled by tilt/bearing control, under control by interference control in the direction;
measuring a new value of the interfering signal and comparing the new value of the interfering signal with the value of the stored interfering signal and storing the new value;
repeating the adjusting step as long as the measured interfering signal has a value above or equal to the threshold value; and
stopping if a new measured interfering signal has a value below the threshold value, adjust the bearing of the overlap of the two beam patterns of the two selected adjacent antenna elements to a predetermined default value.

8. The method according to claim 1, further comprising the step of performing the adjustment of the beam patterns of the antenna elements mechanically.

9. The method according to claim 1, further comprising the step of implementing the method in a cellular communication system.

10. A method for reducing undesired interference from a radio signal source in a wireless radio communication system comprising radio base stations and mobile stations, each radio base station having a multiple of antenna elements, which antenna elements are mounted in each others vicinity such that their beam patterns have a predetermined overlap, comprising the steps of:
adjusting at least two of the antenna elements so as to adjust the area of the overlap of the beam patterns in a substantial horizontal plane, wherein
the area of the overlap of the beam patterns in a substantial horizontal plane of the at least two antenna elements is controlled by interface control such that the area substantially coincides with a position of the interfering signals source; and
controlling a bearing of the one or more beam patterns of the one or more antenna elements depending on interference measurements deployed by an interference control.

11. The method according to claim 10, wherein the overlap of the beam patterns in a substantial horizontal plane are beam patterns from two adjacent positioned antenna elements.

12. The method according to claim 11, wherein the area of the overlap of the beam patterns in a substantial horizontal plane, being the overlap formed by beam patterns from two adjacent positioned antenna elements, depends on the signal strength of the interfering signal source.

13. The method according to claim 10, wherein the bearing of the overlap of the beam patterns in a substantial horizontal plane is adjustable, depending on the interference measurements deployed by an interference control controlling a bearing of two or more beam patterns of two or more adjacent positioned antenna elements.

14. The method according to claim 10, wherein the phase of one or more signals, received by antenna elements, is adapted by controllable phase shift elements and fed to the radio base station, where the amount of phase adapting depends on the interfering signal of the interfering signal source.

15. The method according to claim 10, wherein the one or more antenna elements are tilted, wherein the amount of tilting depends on the interfering signal of the interfering signal source.

16. The method according to claim 10, further comprising the steps of:
detecting by measurement an occurrence of an interfering signal at two or more antenna elements above a threshold value and store the value of the measured interfering signal;
selecting two adjacent antenna elements having an overlap of their beam patterns, which antenna elements receive the two highest interfering signal values and storing the average value of the interfering signals;
adjusting an area of the overlap of the two beam patterns of the two selected adjacent antenna elements, such that the area is reduced, by adjusting the antenna element with the highest received interfering signal into a direction from the antenna element with the second highest received interfering signal, wherein the adjustment is controlled by tilt/bearing control, under control by interference control in the direction;
measuring a new value of the interfering signal and comparing the new value of the interfering signal with the value of the stored interfering signal and storing the new value;
adjusting subsequently an area of the overlap of the two beam patterns of the two selected adjacent antenna elements, such that the area is reduced, by adjusting the antenna element with the highest received interfering signal into a direction from the antenna element with the second highest received interfering signal, if the new received interfering signal is lower than the stored interfering signal, or opposite increase the area if the if the new received interfering signal is higher than the stored interfering signal;

repeating the adjusting step as long as the measured interfering signal has a value above or equal to the threshold value; and stopping if a new measured interfering signal has a value below the threshold value, adjust the bearing of the overlap of the two beam patterns of the two selected.

17. The method according to claim 16, wherein the adjusting steps are executed on the two selected antenna elements.

18. The method according to claim 10 wherein the adjustment beam patterns of the antenna elements is performed mechanically.

19. The method according to claim 10, wherein the method is implemented in a cellular communication system.

* * * * *